United States Patent [19]

Matsumoto et al.

[11] Patent Number: 5,652,739

[45] Date of Patent: Jul. 29, 1997

[54] APPARATUS FOR APPLYING A MAGNETIC FIELD TO A MAGNETO-OPTICAL DISK DEVICE

[75] Inventors: Kenji Matsumoto, Hoya; Kazuhiko Suzuki, Tokorozawa, both of Japan

[73] Assignee: Teac Corporation, Tokyo, Japan

[21] Appl. No.: 687,318

[22] Filed: Jul. 25, 1996

Related U.S. Application Data

[63] Continuation of Ser. No. 260,026, Jun. 15, 1994, abandoned.

[30] Foreign Application Priority Data

Jun. 16, 1993 [JP] Japan .................................. 5-144919

[51] Int. Cl.$^6$ .............................. G11B 11/00; G11B 13/04
[52] U.S. Cl. .............................................. 369/13; 360/114
[58] Field of Search ................................. 369/13, 14, 215, 369/44.22, 231, 219, 244; 360/59, 114, 104, 103, 66, 119, 118; 365/122

[56] References Cited

U.S. PATENT DOCUMENTS 5,043,972  8/1991  Kurihara et al. .................... 369/215
5,291,345  3/1994  Umeda et al. ......................... 360/59
5,434,831  7/1995  Ishii et al. ............................. 369/13
5,517,472  5/1996  Miyatake et al. ..................... 369/13

FOREIGN PATENT DOCUMENTS 3-280203  12/1991  Japan .
4-278421  10/1992  Japan .
5-73807    3/1993  Japan .
5-135306   6/1993  Japan .
5-325104  12/1993  Japan .

Primary Examiner—Ali Neyzari
Attorney, Agent, or Firm—Michael N. Meller

[57] ABSTRACT

An external magnetic field application apparatus is configured such that a magnet, which has a pair of magnetic poles of opposite polarities disposed side by side on a plane, is provided in an arm pivotable around a pin. A moving means, which moves the arm so that the desired one of the pair of magnetic poles is directly opposite a position on a magneto-optical disk on which position a light beam is incident, is constructed of a driving coil provided in the arm and a driving permanent magnet assembled to a yoke assembly so as to be directly opposite the driving coil.

10 Claims, 13 Drawing Sheets

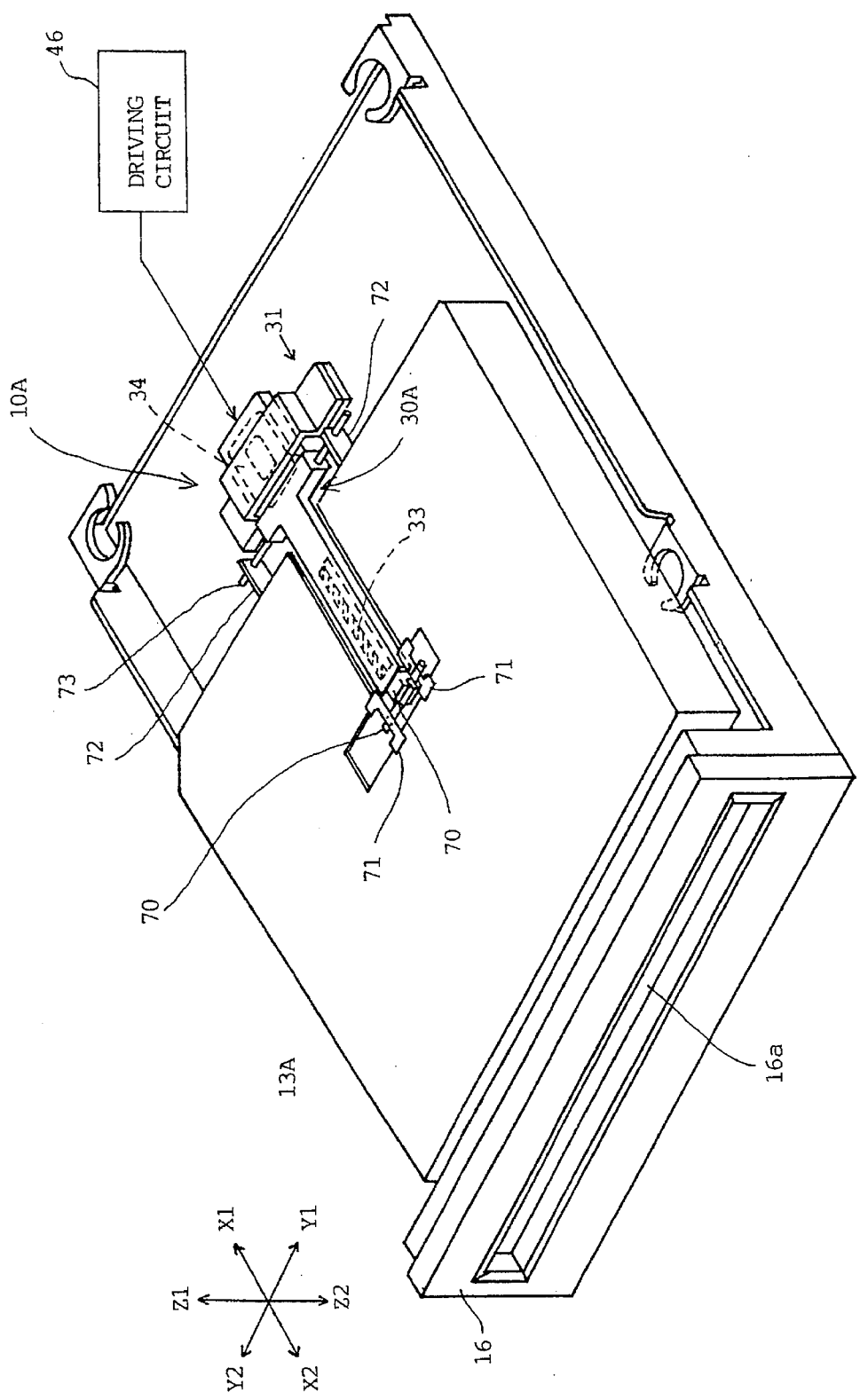

APPARATUS FOR APPLYING A MAGNETIC FIELD TO A MAGNETO-OPTICAL DISK DEVICE

This application is a continuation, of application Ser. No. 08/260,026, filed Jun. 15, 1994 now abandoned.

BACKGROUND OF THE INVENTION

The present invention relates to an external magnetic field application apparatus of a magneto-optical disk apparatus which operates according to a laser power modulation system.

The magneto-optical disk apparatus using a laser power modulation system is provided with an external magnetic field application apparatus which operates in a recording mode such that it applies, when writing, a magnetic field in one direction to a position on a magneto-optical disk impinged by a light beam emitted from an optical head. For erasing purposes, it applies a magnetic field in a reverse direction.

One such external magnetic field application apparatus of a conventional magneto-optical disk apparatus is disclosed in the Japanese Laid-Open Patent Application Ser. No. 4-278241.

The conventional apparatus disclosed in the above application is constructed such that a pivotable support plate (arm) provided with a permanent magnet having magnetic poles of opposite polarities adjacent each other and with a driving permanent magnet, is assembled, by a pin member, to a cartridge holder into which a cartridge accommodating a magneto-optical disk is inserted. In this application yokes are provided with a driving coil facing the driving permanent magnet assembled to the cartridge holder.

A current is applied to a driving coil so that the arm is moved around the pin member between two extreme positions. As this movement of the arm is repeated, the magnetic field applied to a portion of the magneto-optical disk directly opposite the optical head is reversed accordingly.

However, the conventional apparatus described above has one drawback in that, since the driving permanent magnet is provided in the arm, the entire arm becomes relatively heavy. As a result, the moment of inertia of the pivotable support plate is great and the frequency at which the arm reverses its position is low. This causes magneto-optical disk writing and erasing operation to be slowed down, and requires that a relatively large current be supplied to the driving coil.

Also, the arrangement whereby the yokes provided with the driving coil is assembled to the cartridge holder invites an increase in the temperature of the surface of the magneto-optical disk. This brings about the possibility that information cannot be accurately written to and read from the magneto-optical disk. Further, in the above described construction in which the arm and the yokes are provided in the cartridge holder, a limit is imposed on the space in which the yokes etc. are mounted due to the requirement of making the magneto-optical disk apparatus thin. Hence, there is a problem that the degree of freedom in constructing the yokes etc. is small.

In the above described conventional technology, the arm provided with a permanent magnet having magnetic poles of opposite polarities adjacent each other is moved around the pin member between two extreme positions so that the magnetic field applied to a portion of the magneto-optical disk directly opposite the optical head is reversed according to the movement of the arm. In this construction, the size (width) of the permanent magnet, the length of the arm, the position of the pivot around which the arm is rotatable (the position of the pin member) have to be adjusted as accurately as possible so as to obtain a uniform magnetic field both when the portion of the magneto-optical disk directly opposite the optical head resides toward the center of the disk or when that portion resides toward the periphery thereof.

Moreover, the construction in which the means for moving the arm is formed of a driving coil, a driving permanent magnet and the like has a problem in that the driving coil and the like are relatively expensive, thus preventing reducing the cost of the entire apparatus.

SUMMARY OF THE INVENTION

Accordingly, it is a general object of the present invention to provide an external magnetic field application apparatus of a magneto-optical disk apparatus, which application apparatus enables a high-speed switching between an erasing operation and a writing operation.

A more specific object of the present invention is to provide an external magnetic field application apparatus of a magneto-optical disk apparatus, in which application apparatus information signals can be recorded on the magneto-optical disk at a higher speed than by the conventional technology, and the power supply to the driving coil can be reduced. For this purpose, the entire arm is formed to be lighter than the conventional arm by assembling only the driving coil to the arm, the driving coil and the driving permanent magnet constituting the arm moving means, so that the moment of inertia of the arm is smaller than that of the conventional arm and the arm can switch its position more rapidly than in the conventional technology.

A still more specific object of the present invention is to provide an external magnetic field application apparatus of a magneto-optical disk apparatus, comprising: a magnet having a pair of magnetic poles of opposite polarities disposed side by side on a plane; an arm provided with the magnet; and moving means for moving the arm so that the desired one of the pair of magnetic poles is directly opposite a position on a magneto-optical disk on which position a light beam is incident, wherein the moving means includes a driving coil provided in the arm and a driving permanent magnet provided opposite the driving coil.

According to the present invention, the moment of inertia of the arm is controlled to be small by constructing the entire arm to be lightweight such that only the driving coil is provided in the arm, the driving permanent magnet and the driving coil constituting the moving means. In this way, the arm can move between two extreme positions at a rapid rate. Hence, an operation of writing signals on a magneto-optical disk can be performed at a high speed, and the power supply to the driving coil can be controlled to be low.

Another specific object of the present invention is to provide an external magnetic field application apparatus of a magneto-optical disk apparatus, comprising: a magnet having a pair of magnetic poles of opposite polarities disposed side by side on a plane; an arm provided with the magnet; and moving means for moving the arm so that the desired one of the pair of magnetic poles is directly opposite a position on a magneto-optical disk on which position a light beam is incident, wherein the moving means is disposed outside the magneto-optical disk in a radial direction.

According to the present invention, since the moving means is disposed outside the magneto-optical disk, the increase in the temperature of the magneto-optical disk is restrained. Thus, it is possible to achieve an accurate writing and reading of information, and the degree of freedom in constructing the moving means is increased.

Still another specific object of the present invention is to provide an external magnetic field application apparatus of a magneto-optical disk apparatus, comprising: a magnet having a pair of magnetic poles of opposite polarities disposed side by side on a plane; an arm provided with the magnet; supporting means for supporting the arm so that the arm is movable in a direction parallel to a recording surface of a magneto-optical disk; and moving means for moving the arm so that the desired one of the pair of magnetic poles is directly opposite a position on the magneto-optical disk on which position a light beam is incident.

According to the present invention, it is possible to make the magnetic field to be uniform over the entire surface of the magneto-optical disk, from the peripheral part to the center thereof, because the arm, which is provided with the magnet, is moved parallel to the surface of the magneto-optical disk by the moving means such that the arm is guided by guiding rods, and, accordingly, the magnet is moved parallel to the surface of the magneto-optical disk. Also, since the arm is supported by not one but a plurality of points, that is, the arm is supported by guiding rods, it is easy to ensure that the arm and the magnet (provided in the arm) are disposed parallel to the mounted magneto-optical disk.

Still another specific object of the present invention is to provide an external magnetic field application apparatus of a magneto-optical disk apparatus, comprising: a magnet having a pair of magnetic poles of opposite polarities disposed side by side on a plane; an arm provided with said magnet and moving means for moving said arm so that the desired one of said pair of magnetic poles is directly opposite a position on said magneto-optical disk on which position a light beam is incident, wherein said moving means includes a rack part provided in said arm and a motor having a pinion meshed with said rack part.

Since the arm moving means of the present invention is constructed of a rack provided in the arm and a relatively inexpensive motor having a pinion meshed with the rack, the cost of producing the entire external magnetic field application apparatus can be reed.

BRIEF DESCRIPTION OF THE DRAWINGS

Other objects and further features of the present invention will be apparent from the following detailed description when read in conjunction with the accompanying drawings, in which:

FIG. 5 is a perspective view of a driving magnet and the like;

FIG. 13 is a schematic perspective view of the magneto-optical disk apparatus to which the external magnetic field application apparatus according to the second embodiment of the present invention is applied;

DESCRIPTION OF THE PREFERRED EMBODIMENTS

A description will now be given of the embodiments of the present invention, with reference to the drawings.

Figure 1:
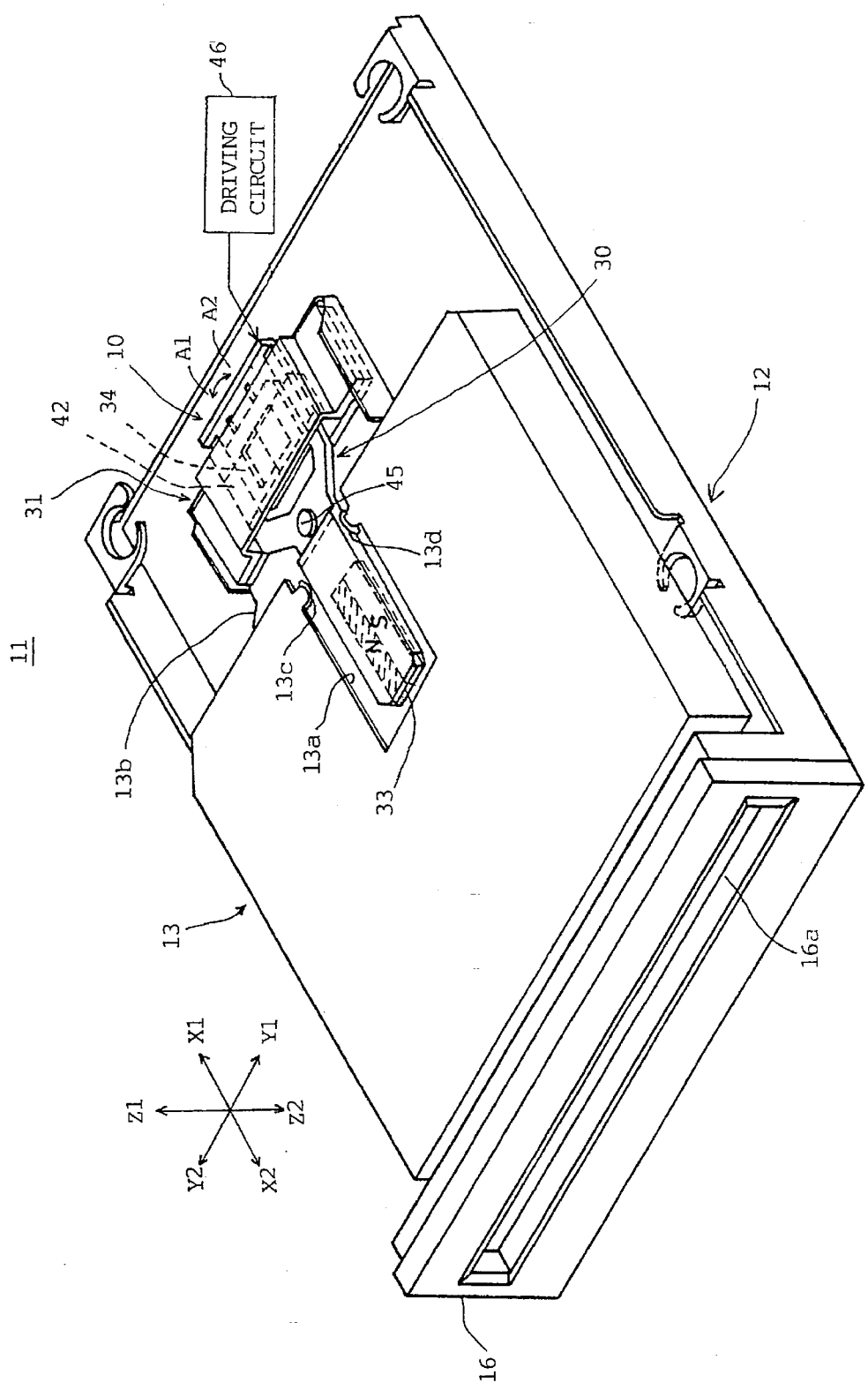
FIG. 1 is a schematic perspective view of a magneto-optical disk apparatus to which the external magnetic field application apparatus according to a first embodiment of the present invention is applied.

FIG. 1 shows an external magnetic field application apparatus 10 according to a first embodiment of the present invention.

The external magnetic field application apparatus 10 forms a part of a magneto-optical disk apparatus 11 of a laser power modulation type.

For convenience of the description, a description will first be given of the general construction of the magneto-optical disk apparatus 11.

The magneto-optical disk apparatus 11 generally comprises a chassis 12, a cartridge holder 13 fixed on the chassis, an optical head 14 provided below the cartridge holder 13 (see FIG. 3), an external magnetic field application apparatus 10 and a motor 15 for turning a turntable (see FIG. 6).

The cartridge holder 13 has a window 13a extending from near the center thereof in the X1 direction.

The optical head 14 is supported by a flat plate 12a provided in the chassis 12 and is located immediately below the window 13a of the cartridge holder 13. The optical head 14 is movable in the X1 and X2 directions within the range defined by the window 13a.

The motor 15 for turning the turntable is located substantially below the center of the cartridge holder 13 and can be lifted in the Z1 direction and lowered in the Z2 direction.

Figure 2:
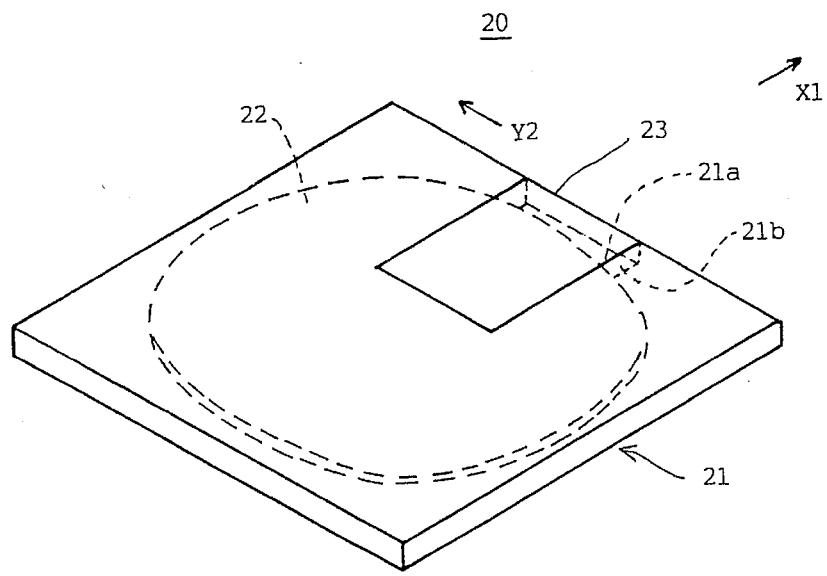
FIG. 2 is a schematic perspective view of a magneto-optical disk cartridge.

A magneto-optical disk cartridge 20 shown in FIG. 2 is mounted in the magneto-optical disk apparatus 11.

The magneto-optical disk cartridge 20 is formed such that a magneto-optical disk 22 is accommodated in a cartridge case 21.

The cartridge case 21 has windows 21a and 21b. The windows 21a and 21b are normally covered by a shutter 23.

Figure 3:
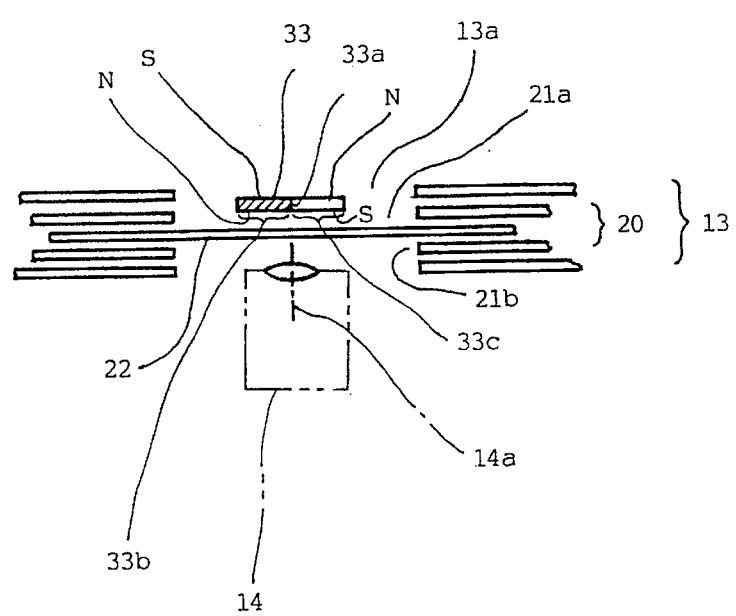
FIG. 3 is a cross sectional view of the cartridge holder in which the magneto-optical disk cartridge is accommodated.

The magneto-optical disk cartridge 20 is mounted in the magneto-optical disk apparatus 11 such that it is inserted through an insertion opening 16a of a front bezel 16 (see FIG. 1) and is accommodated in the cartridge holder 13. During insertion, the shutter 23 is slid in the Y2 direction. As shown in FIG. 3, the upper window 21a is opened after the insertion and is opposite the window 13a of the cartridge holder 13. The lower window is also opened after the insertion and is opposite the optical head 14.

A description will now be given of the construction of the external magnetic field application apparatus 10.

Figure 4:
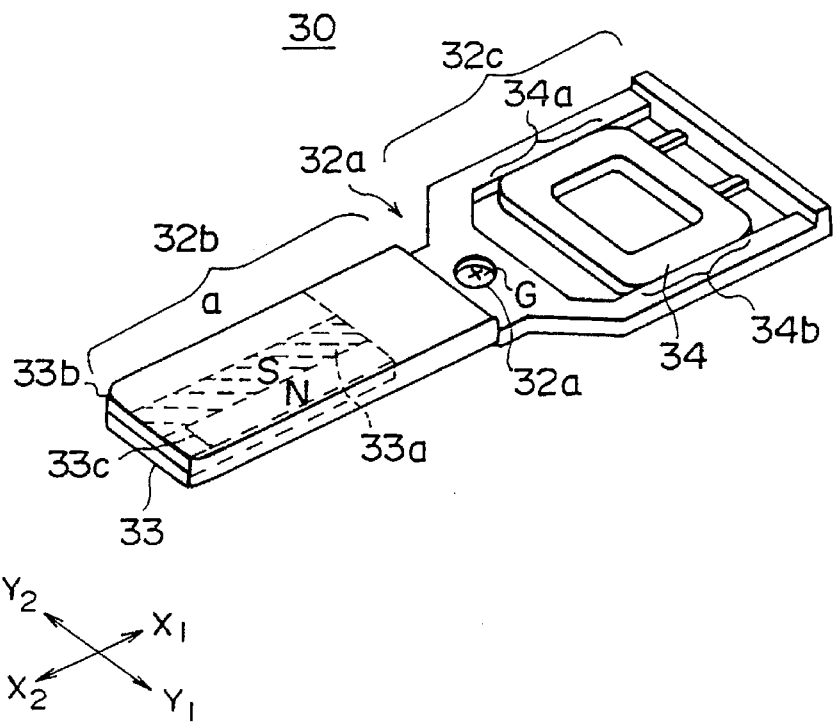
FIG. 4 is a perspective view of an arm according to a first embodiment of the present invention.
Figure 5:
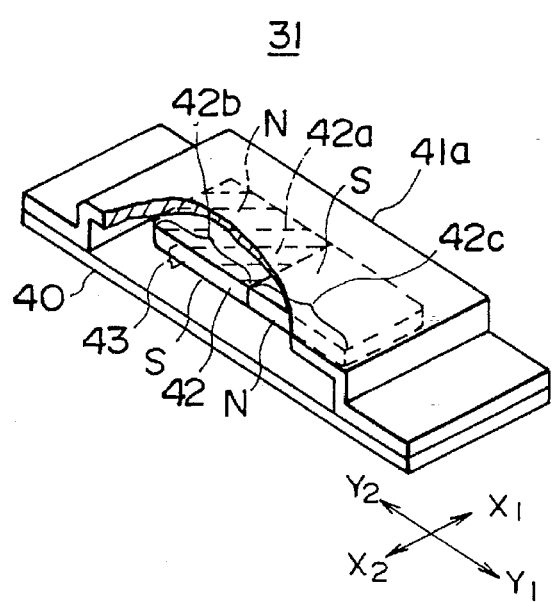

The external magnetic field application apparatus 10 is formed of an arm assembly 30 shown in FIG. 4 and a yoke assembly 31 shown in FIG. 5.

As shown in FIG. 4, the arm assembly 30 has an arm 32 having a substantially flat shape, a permanent magnet 33 for applying a magnetic field to the magneto-optical disk 22, and a driving coil 34.

The arm 32 has an arm part 32b having a substantially rectangular shape and extending from a central hole 32a of the arm 32 in the X2 direction, and a frame part 32c having a substantially rectangular shape and extending from hole 32a in the X1 direction.

The permanent magnet 33 is a rectangular plate body and is adhesively fixed to the underside of the arm part 32b.

The permanent magnet 33 is formed such that a portion thereof extending from a longitudinal central line 33a in the Y1 direction and a portion thereof extending from the central line 33a in the Y2 direction are magnetized with opposite poles, the magnetization being carried out in the direction of the thickness of the arm. As a result, permanent magnet parts 33b and 33c having opposite polarity alignments are provided adjacent each other.

The permanent magnet 33 has a length a substantially commensurate with the radius of the magneto-optical disk 22.

The driving coil 34 is flat-shaped and has the same thickness as that of the arm 32. At the Y1 and Y2 direction ends of the substantially rectangular frame formed by the driving coil 34 are respective lateral portions 34b and 34a extending in the X1 and X2 directions.

The driving coil 34 is adhesively fixed to the frame part 32c and is accommodated in the frame part 32c.

The hole 32a is located at the center of gravity G of the arm assembly 30.

As shown in FIG. 5, the yoke assembly 31 includes a flat-shaped lower yoke 40, an upper yoke 41 above the lower yoke 40, and a driving permanent magnet 42. The upper yoke 41 has a substantially U-shaped central portion 41a.

The driving permanent magnet 42 is a rectangular plate body and is adhesively fixed to the underside of the central part 41a, the longitudinal axis of the driving magnet 42 being aligned with the Y1-Y2 direction.

The driving permanent magnet 42 is formed such that a portion thereof extending from a X1-X2 direction central line 42a in the Y1 direction and a portion thereof extending from the central line 42a in the Y2 direction are magnetized with opposite poles, the magnetization being carried out in the direction of the thickness of the driving permanent magnet 42. As a result, permanent magnet parts 42b and 42c having opposite polarity alignments are provided adjacent each other.

The yoke assembly 31 has a narrow, extended magnetic field space 43 between the permanent magnet 42 and the lower yoke 40. A magnetic field formed by magnetic flux aligned in the Z1-Z2 direction is formed in the magnetic field space 43.

As shown in FIG. 1, the cartridge holder 13 has a support plate part 13b projecting from an X1-direction end of the cartridge 13 in the X1 direction.

The yoke assembly 31 is fitted to the support plate part 13b.

The arm assembly 30 is supported on the support plate 13b so as to be rotatable in the A1-A2 direction in the X-Y plane such that the hole 32a is supported by a pin 45 having a head and erected on the support plate part 13b.

The arm part 32b and the permanent magnet 33 are located in the window 13a.

The frame part 32c and the driving coil 34 are located in the magnetic field space 43.

The cartridge holder 13 has stopper parts 13c and 13d projecting from respective sides of the window 13a. The stopper parts 13c and 13d restrains the range of rotational movement of the arm assembly 30.

Referring to FIG. 1, when a driving current flowing a predetermined direction is supplied to the driving coil 34 by a driving circuit 46, the arm assembly 30 is rotated to a position at which the arm part 32b is in contact with the stopper part 13c or 13d.

In a writing mode, the arm assembly 30 moves in the window 13a between two extreme positions marked by the stopper parts 13c and 13d at a rapid rate.

A comparison will now be made between the driving coil 34 and the driving permanent magnet 42.

The coil 34 is lighter than the permanent magnet 42.

Accordingly, the arm assembly 30 is lighter than a hypothetical arm assembly having a structure in which the permanent magnet 42 is provided therein instead of the coil 34. Thus, the moment of inertia of the arm assembly 30 with respect to the pin 45 is smaller than that of the hypothetical arm assembly having such a structure.

Therefore, the arm assembly 30 can be moved between the two extreme positions at a more rapid rate than can the hypothetical arm assembly having the above described structure.

A description will now be given, with reference to FIGS. 6 and 7, of a mechanism 60 for lifting and lowering the motor 15 for turning the turntable.

The lifting/lowering mechanism 60 comprises a latch 61, a spring 62, an arm 63, an arm 64, and a slider 67, and the like.

The latch 61 is formed with a spindle axis 61a and an engagement part 61b. The spindle axis 61a is fitted with a spring 62 having one end thereof fixed to a fixing member 62a and having the other end thereof engaged with the engagement part 61b. When the magneto-optical disk cartridge 20 is not inserted into the cartridge holder 13 (that is, when the cartridge is not mounted in the disk apparatus), the restoring force of the spring 62 causes the latch 61 to be rotated by a predetermined angle around the spindle axis 61a in the B direction indicated by the arrow shown in FIG. 6. This results in a peripheral surface 61c of the latch 61 being engaged with an engagement part 63a provided in the arm 63. The arm 63 is disposed on the chassis 12 so as to be movable in the X1 direction indicated by the arrow. When the cartridge is not mounted in the disk apparatus, the arm 63 is removed from a position indicated in FIG. 6 by a predetermined distance in the X1 direction.

The X2 direction end of the arm 63 is provided with an engagement part 63c in which a rectangular hole 63b is formed.

The arm 64 is formed of a base arm 65 and an end arm 66. The base arm 65 is provided with a pin member 65a. The pin member 65a is engaged with the rectangular hole 63b of the arm 63 so as to connect the arm 64 with the arm 63. The end arm 66 is rotatable around a spindle axis 64a. A pin member 66a provided in the end arm 66 is engaged with a rectangular hole 67a formed in the slider 67 so as to connect the arm 64 with the slider 67. The slider 67 is movable in the X1–X2 direction indicated in FIG. 6.

The slider 67 is provided with guide plates 67b–67e, and each of the guide plates 67b–67e is provided with a gutter 67f (not shown for convenience of the description).

Pin members 15a and 15b provided in the motor 15 for turning the turntable are engaged with the gutters 67f of the guide plates 67b and 67c. Pin members 15c and 15d also provided integral with the motor 15 are engaged with the gutters 67f of the guide plates 67d and 67e.

Figure 6:
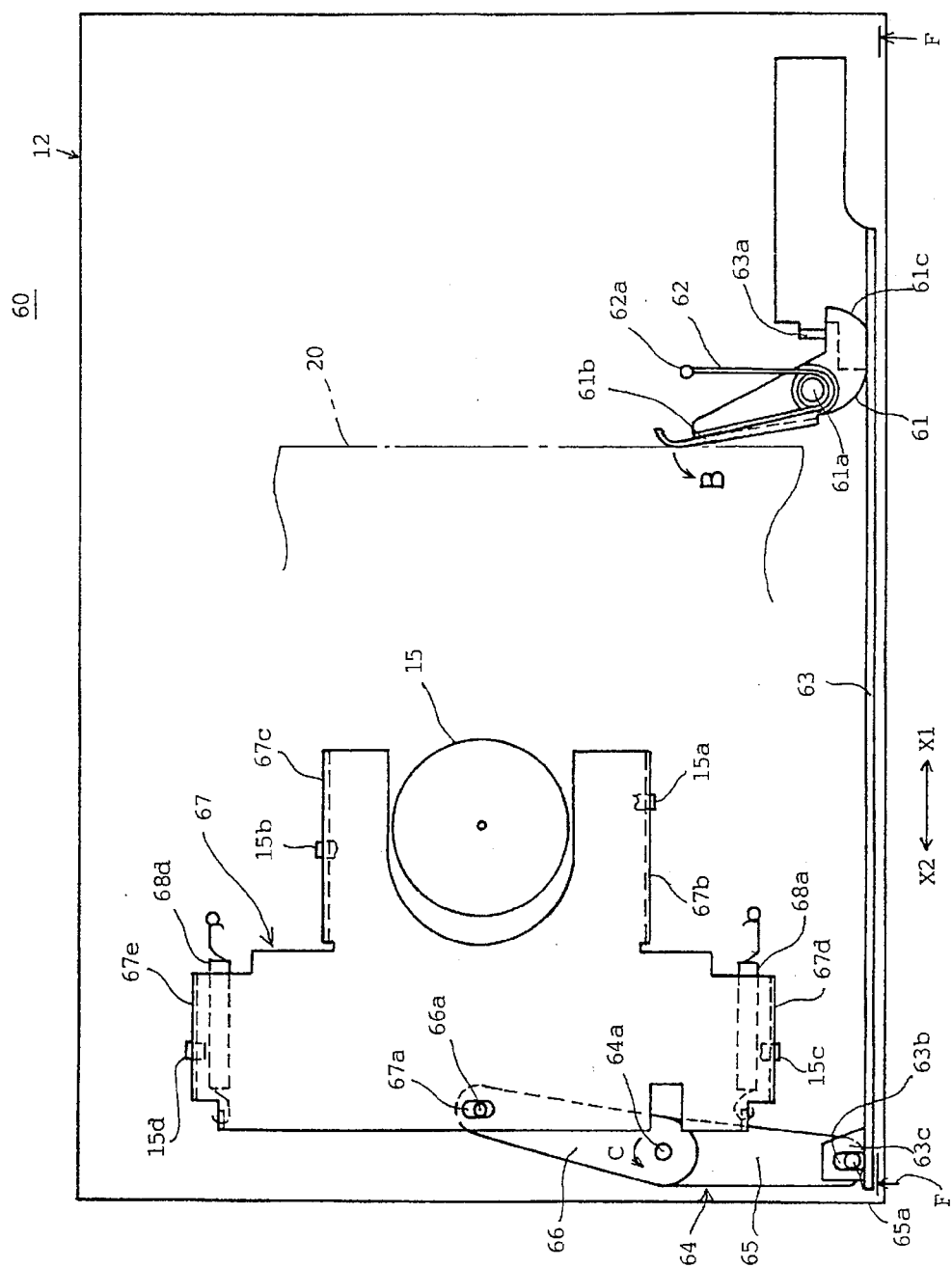
FIG. 6 is a top view of a spindle motor and a spindle motor lifting/lowering mechanism wherein the magneto-optical disk cartridge is accommodated in the cartridge holder.
Figure 7:
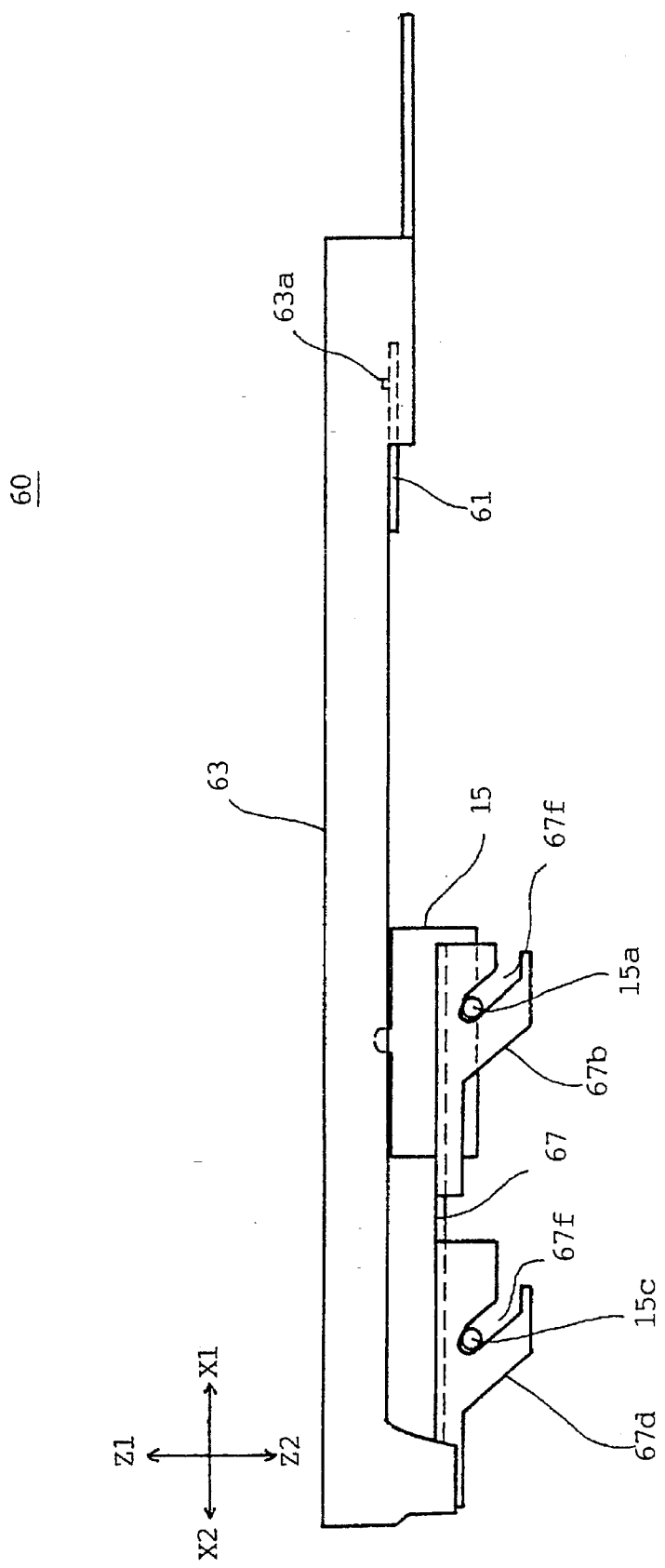
FIG. 7 is a cross sectional view taken along the line F—F of FIG. 6.

The slider 67 is always urged in the X1 direction indicated in FIG. 6 by spring member 68a and 68b.

When the cartridge 20 is not mounted in the disk apparatus, the arm 63 is at a first position displaced in the X1 direction, the slider 67 is at a first position displaced in the X2 direction, and the motor 15 is at a lower position.

When the cartridge 20 is inserted into the holder 13 through the opening 16a, the lifting/lowering mechanism 60 having the above described construction starts to operate.

At the final stage of insertion of the cartridge 20, the cartridge 20 pushes the latch 61 so that the latch 61 is rotated. This releases the latch 61 from its engagement with the arm 63. The slider 67 is then slid in the X1 direction by means of the springs 68a and 68b to reach the position indicated in FIGS. 6 and 7.

Consequently, the pin members 15a–15d are guided by the gutters 67f to reach the upper end of the gutters 67f. The motor 15 for turning the turntable is lifted in the Z1 direction to reach the position indicated in FIG. 7. The turntable enters the window 21b, while the magneto-optical disk 22 is mounted on the turntable.

When the magneto-optical disk apparatus 11 is set to a recording mode or a reading mode, the motor 15 is started so that the magneto-optical disk 22 is rotated in the cartridge case 21.

A description will now be given, with reference to FIGS. 8 through 12, of the operation of the external magnetic field application apparatus 10 having the above described construction.

As shown in FIG. 3, when the magneto-optical disk cartridge 20 is mounted in the disk apparatus, a part of the permanent magnet 33 for applying a magnetic field to the magneto-optical disk 22 enters a space below the upper window 21a, which is exposed by the shutter 23 being open after the insertion. In this state, the permanent magnet 33 is directly opposite the upper surface of the magneto-optical disk 22.

A part of the optical head 14 enters a space above the lower window 21b, which is exposed by the shutter 23 being open after the insertion. In this state, the optical head 14 is directly opposite the underside of the magneto-optical disk 22.

[In stop mode and read mode]

The driving coil 34 is not supplied with a driving current.
The arm assembly 30 is at a position indicated in FIG. 8.
As shown in FIG. 3, the permanent magnet 33 for applying a magnetic field to the magneto-optical disk 22 is at a position at which the central line 33a thereof crosses the central line 14a of the optical head 14.

[In recording mode]

Recording is done such that, during a first rotation of the magneto-optical disk 22, information already written on the track to which the desired information signal is to be written is erased, and during a second rotation of the magneto-optical disk 22, the desired information is written on the track from which the past information has been erased. This operations are repeated. That is, in a recording mode, the erasure and writing are repeated frequently.

The driving circuit 46 outputs a large current in a predetermined direction, then a smaller current, then a large current in a direction opposite the predetermined direction, and then a smaller current.

The current is supplied to the driving coil 34 positioned inside the magnetic field space 43. [Erasing operation]

Figure 8:
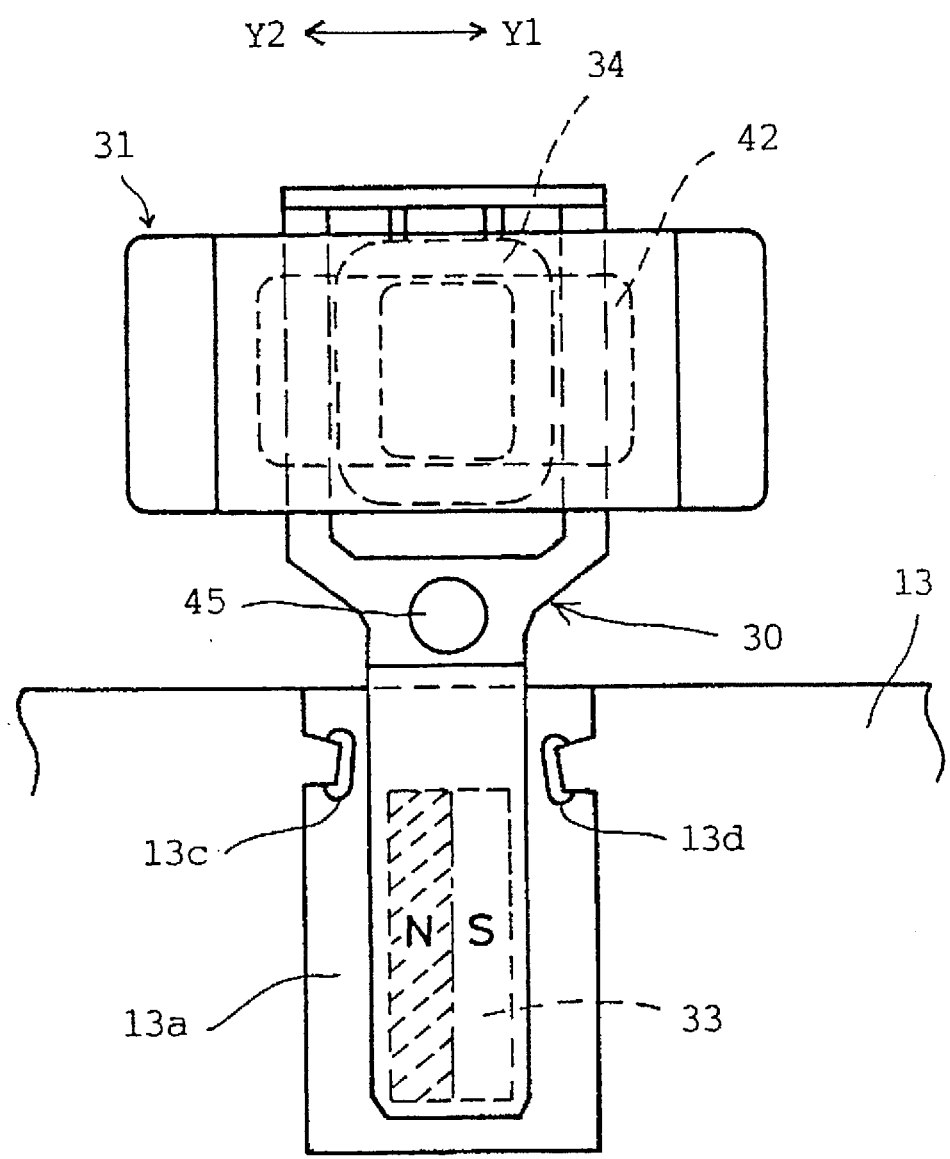
FIG. 8 is a diagram explaining the operation of the present invention (part 1)
Figure 11:
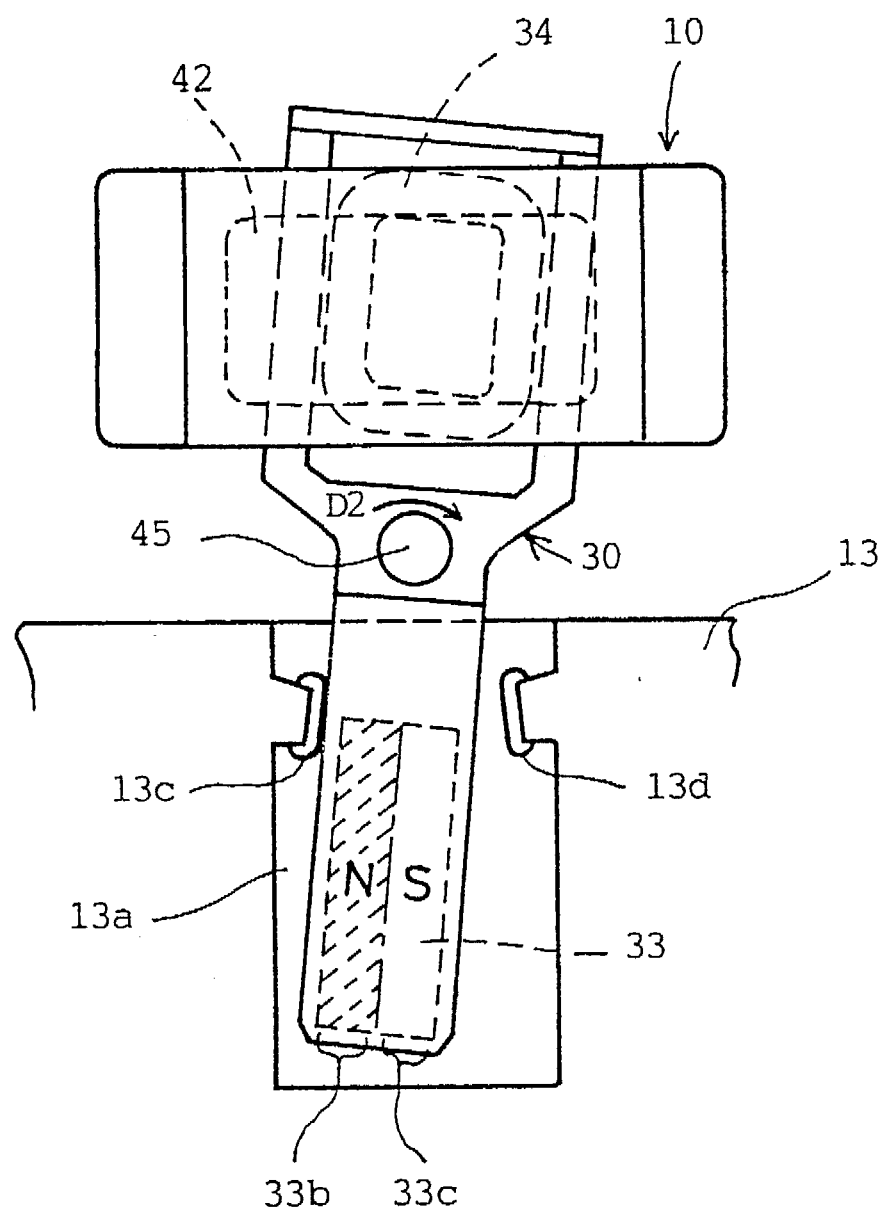
FIG. 11 is a diagram explaining the operation of the present invention (part 4)

First, a force exerted in the Y1 direction indicated in FIG. 8 is induced in the driving coil 34 according to the left-hand rule so that, as shown in FIG. 11, the arm assembly 30 is rotated, for example, 50 degrees, in the D2 direction around the pin member 45 until it is in contact with the stopper part 13c. The arm composition body 30 maintains its position after the rotation.

Figure 12:
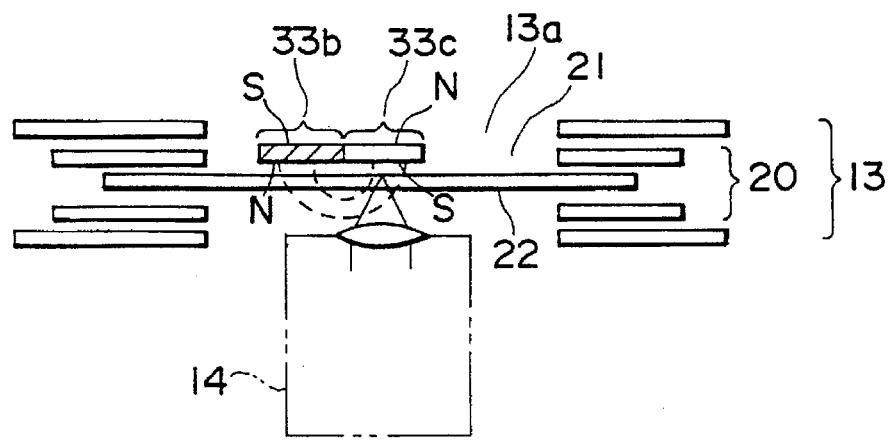
FIG. 12 is a diagram explaining the operation of the present invention (part 5)

As a result of this, as shown in FIG. 12, the permanent magnet part 33c of the permanent magnet for applying a magnetic field to the magneto-optical disk 22 becomes directly opposite the optical head 14.

Consequently, an upward magnetic field is applied to a target track of the magneto-optical disk 22 to which track the new information signal is to be recorded.

A light beam having a regular light intensity is projected from the optical head 14 so as to be incident on the target track.

This causes the information written on the target track to be erased during a first rotation of the magneto-optical disk 22.

[Writing operation]

Figure 9:
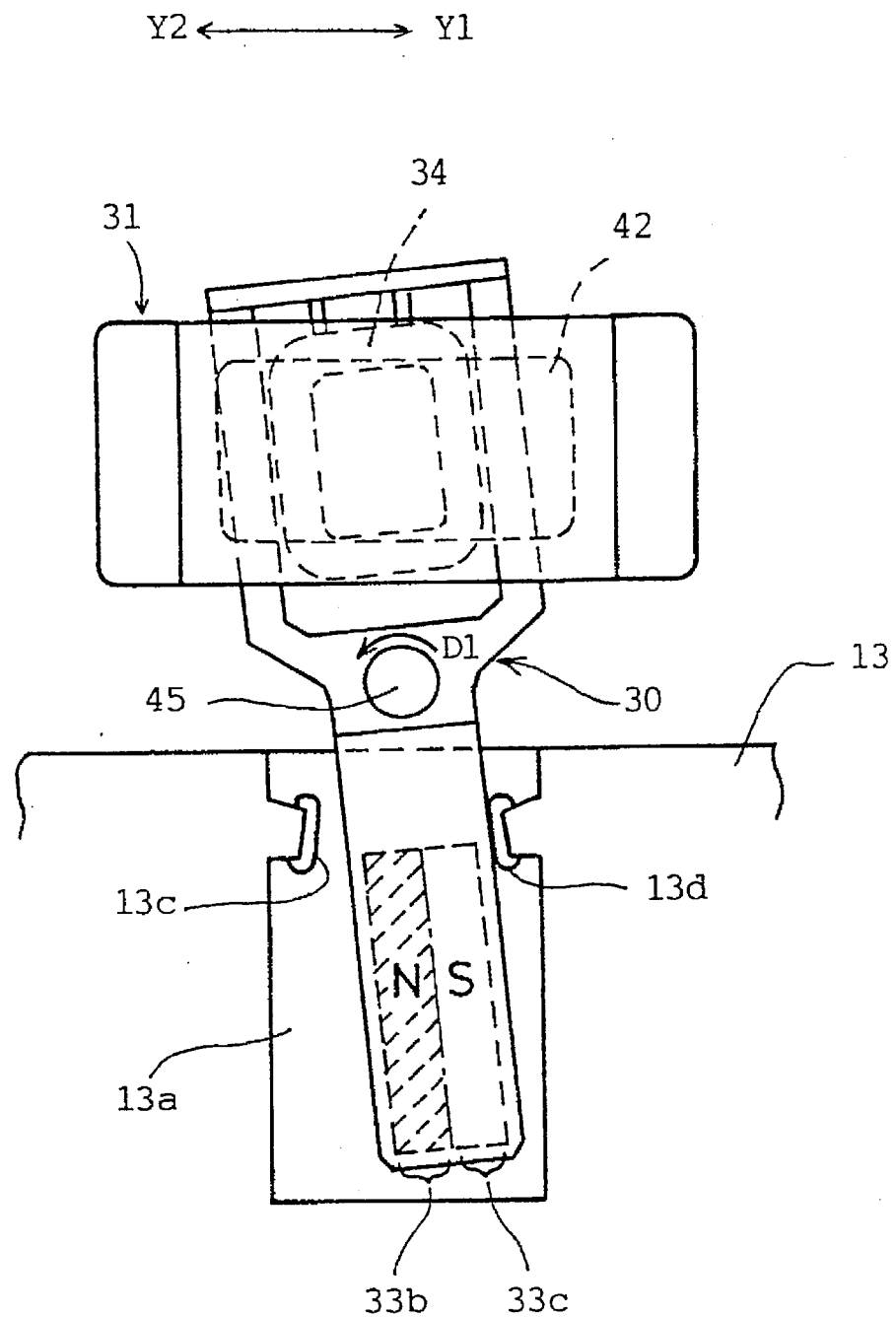
FIG. 9 is a diagram explaining the operation of the present invention (part 2)

Subsequently, a current having a reverse direction is supplied to the driving coil 34 so that a force exerted in the Y2 direction indicated in FIG. 11 is induced in the driving coil 34. The arm assembly 30 reverses its position by being rotated approximately 10 degrees in the D1 direction indicated by the arrow until it is in contact with the stopper part 13d, as shown in FIG. 9. The arm composition body 30 maintains its position after the rotation.

Figure 10:
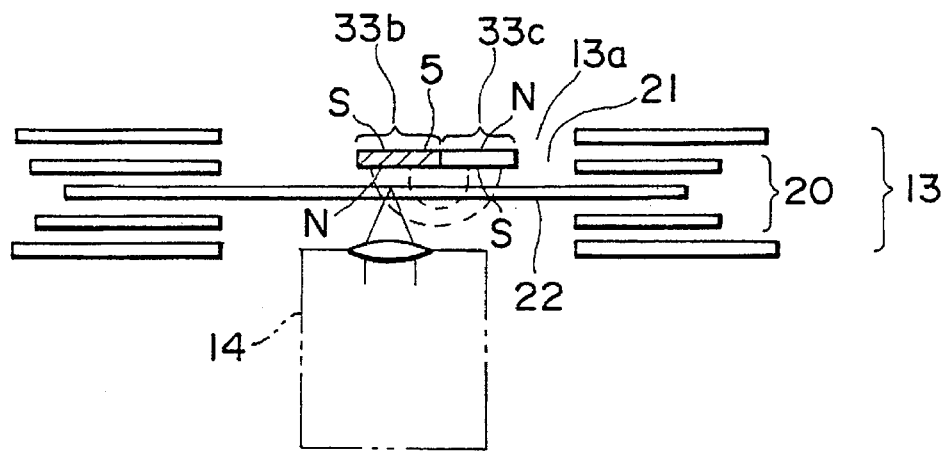
FIG. 10 is a diagram explaining the operation of the present invention (part 3)

As a result of this, the permanent magnet part 33b of the permanent magnet 33 for applying a magnetic field to the magneto-optical disk 22 becomes directly opposite the optical head 14, as shown in FIG. 10.

This causes a downward magnetic field to be applied to the track of the magneto-optical disk 22, to which track the information is to be written.

In this state, the light intensity of the light beam projected from the optical head 14 is made to vary in accordance with the information to be written so that the information signal is written in the track from which the past information is erased.

Subsequently, the erasing operation is performed on another track, whereupon the writing operation is performed in this track. Accordingly, the arm assembly 30 switches its position frequently.

According to the first embodiment described above, the moment of inertia of the arm assembly 30 is controlled to be small by constructing the entire arm assembly 30 to be lightweight such that only the driving coil 34 is provided in the arm 32, the driving permanent magnet 42 and the driving coil 34 constituting the moving means. In this way, the arm assembly 30 can move between two extreme positions at a rapid rate. Hence, switching between the erasing operation and the writing operation of the magneto-optical disk 22 can be performed at a rapid rate, and the power supply to the driving coil 34 can be controlled to be low, thus achieving the object of reducing the power consumption.

The driving permanent magnet 42 and the driving coil 34 constituting the moving means are disposed outside the magneto-optical disk 22 in a radial direction thereof (in the first embodiment described above, they are disposed outside the holder 13 in which the magneto-optical disk cartridge 20 is accommodated). Accordingly the moving means are not provided above the surface of the disk located in the holder 13. This imposes less severe height limitations on the construction of the moving means. It will also be appreciated that there is a lower increase in the temperature of the magneto-optical disk, resulting in accurate writing and reading of information and increased degree of freedom in constructing the driving permanent magnet 42 and the driving coil 34.

Figure 14:
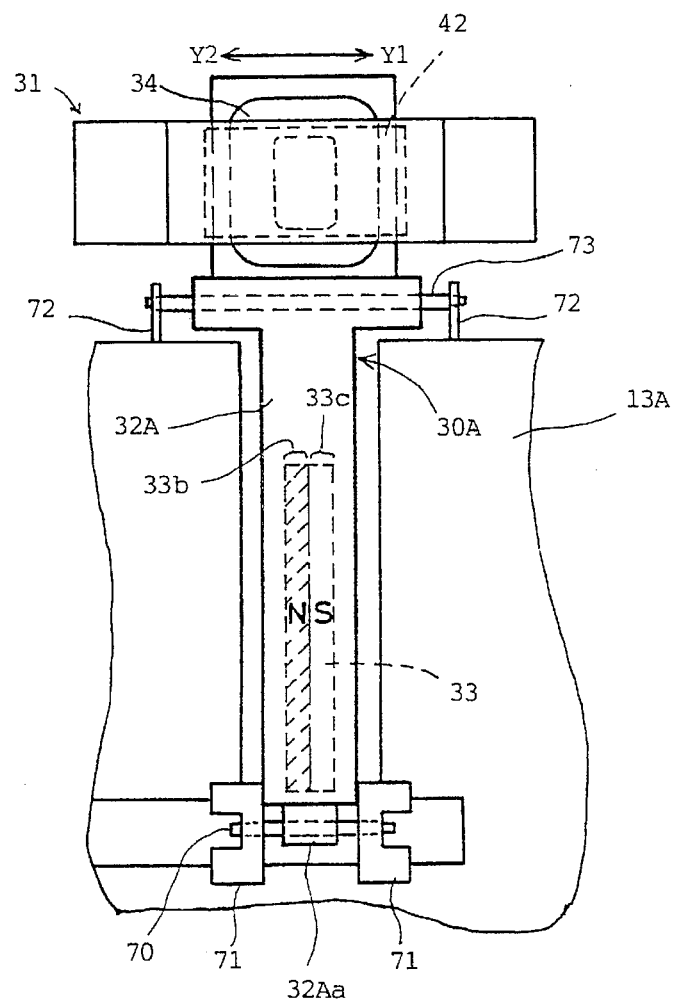
FIG. 14 is an enlarged view of the essential part of the second embodiment of the present invention.
Figure 15:
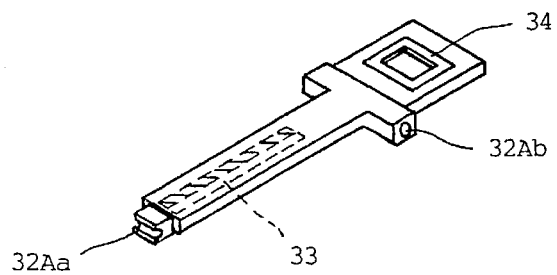
FIG. 15 is a perspective view of the arm according to the second embodiment of the present invention.

A description will now be given of a second embodiment of the present invention. FIG. 13 is a schematic perspective view of the magneto-optical disk apparatus to which the external magnetic field application apparatus according to the second embodiment of the present invention is applied. FIG. 14 is an enlarged view of an essential part of the second embodiment of the present invention. FIG. 15 is a perspective view of the arm. In FIGS. 13–15, those components that are the same as the components of the first embodiment are designated by the same reference numerals, and the description thereof is omitted.

An external magnetic field application apparatus 10A differs from the external magnetic field application apparatus 10 of FIG. 1 in that there is provided a guide rod for guiding the movement of an arm assembly 30A by the moving means.

As shown in FIG. 15, a guide gutter 32Aa is formed at the end of an arm 32A, and a guide hole 32Ab is formed near the base of the arm 32A. As shown in FIGS. 13 and 14, the guide gutter 32Aa of the arm 32A is engaged with a guide rod 70. The guide rod 70 is attached to the cartridge holder 13A via fitting members 71 fixed near the center of a cartridge holder 13A.

A guide rod 73 is threaded through a guide hole 32Ab of an arm 32A. The guide rod 73 is attached to the cartridge holder 13A via fitting members 72 fixed at the back of the cartridge holder 13A.

The arm assembly 30A (arm 32A) is movable by a predetermined distance in the Y1–Y2 direction indicated in FIG. 14 such that the guide gutter 32Aa is guided by the guide rod 70, and the guide hole 32Ab is guided by the guide rod 73.

In this embodiment, like the first embodiment, the motor 15 and the lifting/lowering mechanism 60 are provided below the cartridge holder 13A, and, since the construction and function thereof are the same as those of the first embodiment, the description of the construction and function thereof is omitted.

A description will now give of the function of the second embodiment.

As already described with reference to FIG. 3, when the driving coil 34 is not supplied with a driving current, the magnet 33 is located above the optical head 14 such that the central line 33a of the magnet 33 is substantially aligned with the central line 14a of the optical head 14.

During an erasing operation performed in a recording mode of the magneto-optical disk apparatus, a current is supplied to the driving coil 34 in a predetermined direction so as to generate a predetermined magnetic field in the driving coil 34, thus causing the driving coil 34 to be attracted by the permanent magnet part 42b of the driving permanent magnet 42. Accordingly, the arm assembly 30A is guided by the guide rods 70 and 73 and moved by a predetermined distance in the Y2 direction of FIG. 14. As a result, as already described with reference to FIG. 12, the permanent magnet part 33c of the magnet 33 is directly opposite the optical head 14 so that an upward magnetic field is applied to the track of the magneto-optical disk 22 on which track information signal is to be written, and the information signal already recorded on the track is erased.

During a writing operation performed in a recording mode, a current is supplied to the driving coil 34 in a direction opposite the current direction of the erasing operation, so that a magnetic field of a direction opposite the magnetic field direction of the erasing operation is generated in the driving coil 34, thus causing the driving coil 34 to be magnetically attracted by the permanent magnet part 42c of the driving permanent magnet 42. Accordingly, the arm assembly 40A is guided by the guide rods 70 and 73 and moved by a predetermined distance in the Y1 direction of FIG. 14. As a result, as already described with reference to FIG. 10, the permanent magnet part 33b of the magnet 33 is directly opposite the optical head 14 so that a downward magnetic field is applied to the track of the magneto-optical disk 22 from which track the past information signal has just been erased, and the information signal is written on the track.

In addition to the effects of the first embodiment, the second embodiment described above has the following effects.

The arm 32A is guided by the guide rods 70 and 73 and moved in the Y1 and Y2 directions of FIG. 14 by a moving means including the driving coil 34 and the driving permanent magnet 42. Accordingly, the magnet 33 provided on the underside of the arm 32A is moved together with the arm 32A. Hence, the magnetic field applied to the magneto-optical disk surface is made to be uniform over the entire surface of the magneto-optical disk, from the peripheral part to the center. Also, since the arm 32A is supported at not one but a plurality of points, that is, the arm 32A is supported by the guide rods 70 and 73, it is easy to ensure that the arm 32A and the magnet 33 are disposed parallel to the mounted magneto-optical disk 22.

Figure 16:
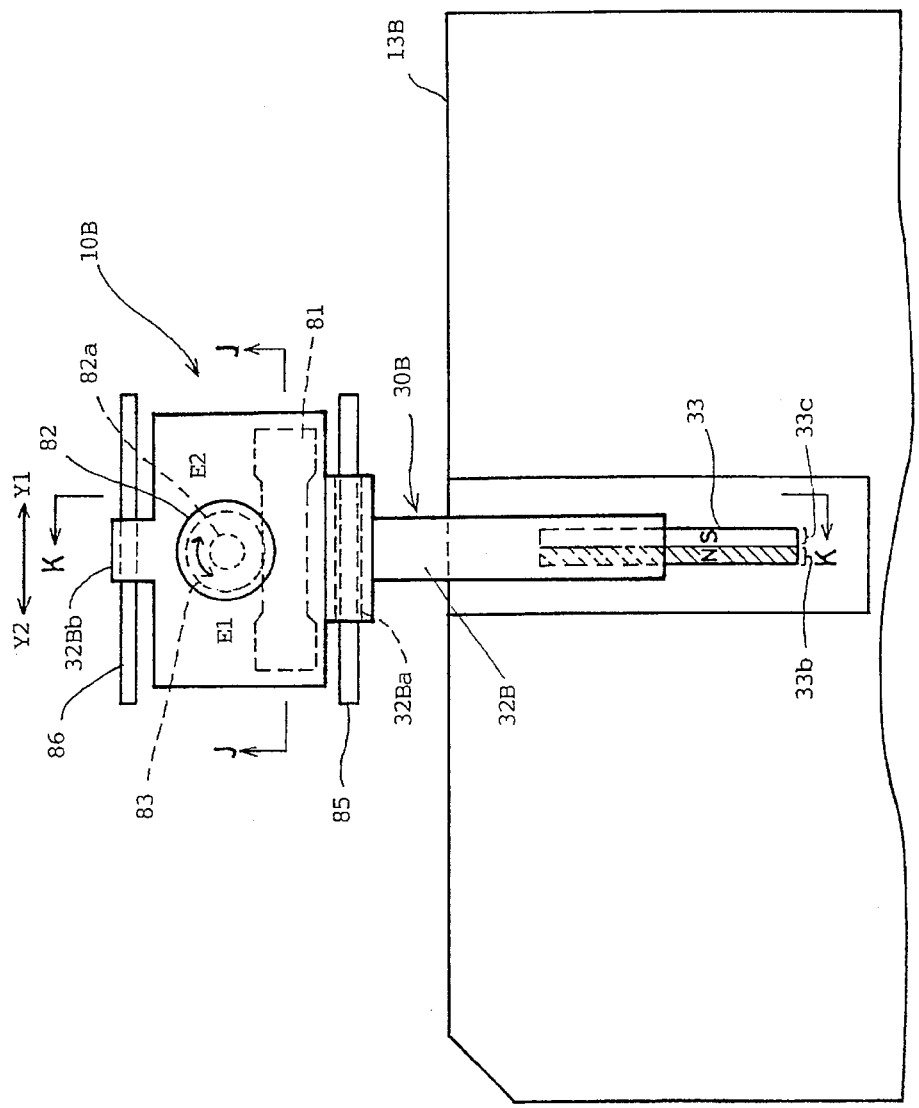
FIG. 16 is a top view of the essential part of the magneto-optical disk apparatus to which the external magnetic field application apparatus according to the third embodiment of the present invention is applied.
Figure 17:
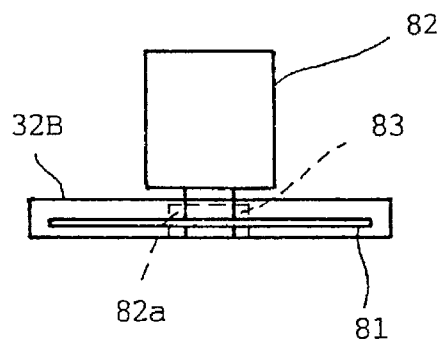
FIG. 17 is a cross sectional view taken along the line J—J of FIG. 16.
Figure 18:
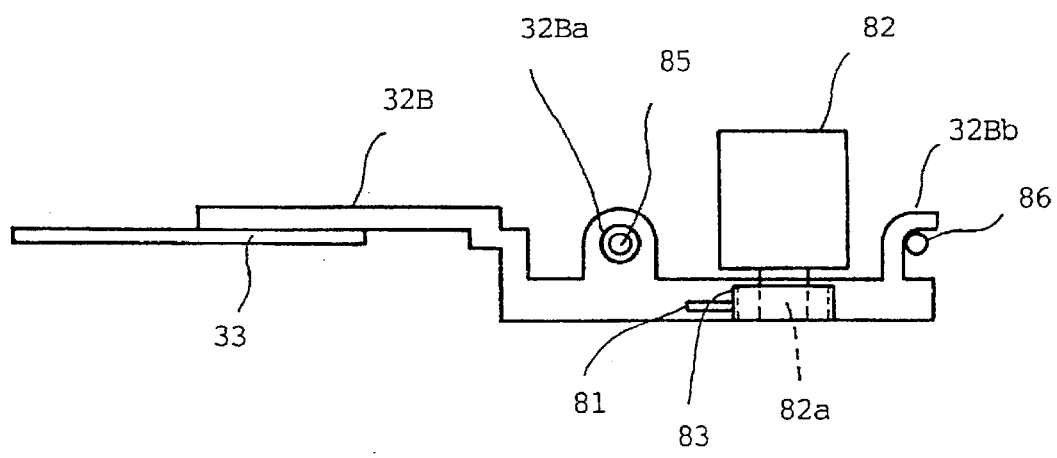
FIG. 18 is a cross sectional view taken along the line K—K of FIG. 16.

A description will now be given of a third embodiment of the present invention. FIG. 16 is a top view of an essential part of the magneto-optical disk apparatus to which the external magnetic field application apparatus according to the third embodiment of the present invention is applied. FIG. 17 is a cross sectional view taken in the line J—J of FIG. 16. FIG. 18 is a cross sectional view taken in the line K—K of FIG. 16. In FIGS. 16–18, those components that are the same as the components of the first embodiment are designated by the same reference numerals, and the description thereof is omitted.

An external magnetic field application apparatus 10B of this embodiment differs from the apparatuses 10 and 10A of the above described first and second embodiments wherein the moving means is formed by the driving permanent magnet 42 and the driving coil 34, in that the moving means is formed by a rack 81 provided in an arm 32B and by a motor 82 in which a pinion 83 meshed with the rack 81 is provided.

As shown in FIGS. 16–18, the rack 81 is provided near the base of the arm 32B. The rack 81 is meshed with the pinion 83 fitted to a spindle axis 82a of the motor 82 fixed to a base plate (not shown).

As shown in FIGS. 16 and 18, a guide hole 32Ba and an engagement part 32Bb are formed in the arm 32B. A guide rod 85 fitted to a fitting member (not shown) is threaded through the guide hole 32Ba, and the engagement part 32Bb is engaged with a guide rod 86 fitted to a fitting member (not shown).

As a result of the motor 82 being driven to rotate the spindle axis 82a in a predetermined direction, that is, by rotating the pinion 83 meshed with the rack 81 in a predetermined direction, the arm 32B is movable by a predetermined distance in the Y1 and Y2 directions of FIG. 16 while being guided by the guide rods 85 and 86.

In this embodiment, like the first embodiment, the motor 15 for turning the turntable and the lifting/lowering mechanism 60 are provided below the cartridge holder 13A, and, since the construction and function thereof are the same as those of the first embodiment, the description of the construction and function thereof is omitted.

A description will now be given of the function of the third embodiment.

During an erasing operation performed in a recording mode, as the motor 82 is driven so as to rotate the spindle axis 82a in the E2 direction of FIG. 16, the pinion 83 is rotated in the same direction. The arm 32B is guided by the guide rods 85 and 86 and moved by a predetermined distance in the Y2 direction of FIG. 16. As a result, as already described with reference to FIG. 12, the permanent magnet part 33c of the magnet 33 is directly opposite the optical head 14 so that an upward magnetic field is applied to the track of the magneto-optical disk 22 on which track information signal is to be written, and the information signal already recorded on the track is erased.

During a writing operation performed in a recording mode, as the motor 82 is driven so as to rotate the spindle axis 82a in a direction opposite the direction of the erasing operation, the pinion 83 is rotated in the E1 direction. The arm 32B is guided by the guide rods 85 and 86 and moved by a predetermined distance in the Y1 direction. As a result, as already described with reference to FIG. 10, the permanent magnet part 33b of the magnet 33 is directly opposite the optical head 14 so that a downward magnetic field is applied to the track of the magneto-optical disk 22 from which track the past information signal has just been erased, and the information signal is written on the track.

In addition to the effects of the first and second embodiments already described, the third embodiment has an advantage of enabling the reduction of producing the entire external magnetic field application apparatus 10B because the arm 32B (arm assembly 30B) moving means is formed of the rack 81 provided in the arm 32B and the relatively inexpensive motor having the pinion 83 meshed with the rack 81.

The present invention is not limited to the above described embodiments, and variations and modifications may be made without departing from the scope of the present invention.

What is claimed is:

1. Apparatus for applying a magnetic field to a magneto-optical disk device having a magneto-optical disc, for high speed switching between writing and erasing information on said disc comprising:

an arm movably mounted in said apparatus;

a magnet mounted on said arm and having a pair of magnetic poles of opposite polarities disposed side by said in substantially the same plane;

and moving means for moving said arm so that one of said pair of magnetic poles is directly opposite a desired position on said magneto-optical disk, wherein said moving means includes a driving coil provided in said arm and a driving permanent magnet provided opposite said driving coil and spaced from said arm, said driving coil being substantially lighter in weight than said driving permanent magnet.

2. The external magnetic field application apparatus as claimed in claim 1, wherein said arm is pivotally mounted between two limiting positions and further comprising supporting means for pivotally supporting said arm whereby said arm may be pivoted between said two limiting positions at a high speed.

3. Apparatus for applying a magnetic field to a magneto-optical disk device having a magneto-optical disc for high speed recording of information signals on said disk, comprising:

an arm movably mounted in said apparatus;

a magnet mounted on said arm and having a pair of magnetic poles of opposite polarities disposed side by side in substantially the same plane;

and moving means for moving said arm so that one of said pair of magnetic poles is directly opposite a desired position on said magneto-optical disk, wherein said moving means being heavier in weight than said arm and spaced from said arm so that said arm has a small moment of inertia, said moving means being spaced from the periphery of said magneto-optical disk in a radial direction to restrain the increase of temperature of said magneto-optical disk during operation.

4. Apparatus for applying a magnetic field to a magneto-optical disk device having a magneto-optical disk for high speed writing and/or reading signal information to/from said disk, comprising:

an arm movably mounted in said apparatus, said arm having first and second end portions;

a magnet mounted on said arm and having a pair of magnetic poles of opposite polarities disposed side by side in substantially the same plane;

supporting means for slidably supporting said arm at each of said first and second end portions in said apparatus so that said arm is movable in a direction parallel to a surface of said magneto-optical disk and said applied magnetic field is uniform over the entire surface of said disc; and moving means for moving said am so that one of said pair of magnetic poles is directly opposite a desired position on said magneto-optical disk, said moving means being heavier in weight than said arm and being spaced from said arm.

5. Apparatus as claimed in claim 4, wherein said supporting means is formed of guide rods for guiding the movement of said arm.

6. Apparatus for applying a magnetic field to a magneto-optical disk device having a magneto-optical disc for high speed writing and/or reading signal information to/from said disk, comprising:

an arm movably mounted in said apparatus;

a magnet mounted on said arm and having a pair of magnetic poles of opposite polarities disposed side by side in substantially the same plane;

supporting means for slidaby supporting said arm at a plurality of support positions in said apparatus so that said arm is moveable in a direction parallel to a surface of said disk and said applied magnetic field is uniform over the entire surface of said disk; and moving means mounted in said apparatus for moving said arm so that one of said pair of magnetic poles is directly opposite a desired position on said magneto-optical disk, wherein said moving means includes a rack provided in said arm and a motor having a pinion meshed with said rack.

7. Apparatus as claimed in claim 1, wherein said desired position on said magneto-optical disk is a position on which a light beam is incident.

8. Apparatus as claimed in claim 3, wherein said desired position on said magneto-optical disk is a position on which a light beam is incident.

9. Apparatus as claimed in claim 4, wherein said desired position on said magneto-optical disk is a position on which a light beam is incident.

10. Apparatus as claimed in claim 6, wherein said desired position on said magneto-optical disk is a position on which a light beam is incident.

* * * * *